(12) United States Patent
Erni et al.

(10) Patent No.: US 6,168,294 B1
(45) Date of Patent: Jan. 2, 2001

(54) AIRPORT TAXI SIGNAL LIGHT HAVING LED LIGHT ARRAY WITH LIGHT PROCESSING ASSEMBLY AND DICHROIC FILTER

(75) Inventors: Ernst R. Erni, Gersau; Andreas Brand, Wallisellen, both of (CH)

(73) Assignee: Ernst Erni, Gersau (CH)

( * ) Notice: Under 35 U.S.C. 154(b), the term of this patent shall be extended for 0 days.

(21) Appl. No.: 09/255,773

(22) Filed: Feb. 23, 1999

(30) Foreign Application Priority Data

Mar. 2, 1998 (CH) .................................................. 491/98

(51) Int. Cl.[7] ..................................................... F21V 7/00
(52) U.S. Cl. ..................... 362/298; 362/551; 362/560; 362/576; 362/293; 362/583; 362/268; 359/833; 359/834; 359/868; 359/884; 359/819
(58) Field of Search ..................................... 362/298, 551, 362/560, 576, 293, 583, 268; 359/833, 834, 868, 884, 819

(56) References Cited

U.S. PATENT DOCUMENTS

| | | | |
|---|---|---|---|
| 3,250,907 | 5/1966 | Keck et al. | 362/308 |
| 4,354,221 | 10/1982 | Hoffman | 362/300 |
| 4,408,266 | 10/1983 | Sclippa | 362/297 |
| 4,860,182 | 8/1989 | Vadseth | 362/364 |
| 4,914,544 | 4/1990 | Dahlberg | 362/153.1 |
| 4,924,364 | 5/1990 | Pannier | 362/153.1 |
| 5,335,151 | 8/1994 | Dahlberg | 362/153.1 |
| 5,414,603 | 5/1995 | Conway | 362/153.1 |
| 5,556,189 | * 9/1996 | Wallis | 362/153.1 |

FOREIGN PATENT DOCUMENTS

| | | | |
|---|---|---|---|
| 1497360 | 6/1969 | (DE) . | |
| 0022106 | 1/1981 | (EP) | F21Q 3/00 |
| 942296 | 11/1963 | (GB) . | |

* cited by examiner

*Primary Examiner*—Sandra O'Shea
*Assistant Examiner*—Ronald E. DelGizzi
(74) *Attorney, Agent, or Firm*—McGuire, Woods, Battle & Boothe, LLP

(57) ABSTRACT

A signal light including a housing is recessed into a traffic surface and projects minimally upwardly from the surface and wherein a light processing assembly is provided to receive light from a light source, intensify the light and direct the light toward a light outlet in a generally linear manner, the arrangement for processing light being mounted to the housing. For this purpose, the light source is designed in such a way that it sends an essentially linearly directed light beam onto the light processing assembly. The light is collected in the light processing assembly in such a way that, when it exits, it is still linearly extending in at least one direction but it has a higher intensity. For this purpose, the light processing assembly includes a cylindrical-convex lens entry surface and a cylindrical concave mirror surface for receiving and directing light.

24 Claims, 9 Drawing Sheets

AIRPORT TAXI SIGNAL LIGHT HAVING LED LIGHT ARRAY WITH LIGHT PROCESSING ASSEMBLY AND DICHROIC FILTER

BACKGROUND OF THE INVENTION

The present invention relates broadly to outdoor lighting systems and, more particularly, to a signal light for incorporation into traffic areas, especially airport runways and taxiways.

Signal lights of this type are provided essentially for incorporation as ground-level units mounted within the pavement and are used especially as guide elements in airports.

Such lights are also adaptable for street traffic conditions. U.S. Pat. No. 5,438,495 to Ahlen et al discloses a signal light which has a deviating prism as optics, which acts to deviate the light beam relative to a horizontal plane. It should be noted at the outset that the term "optics" as used herein shall mean any light manipulating mechanism, assembly, arrangement or means. Nevertheless, in most applications, it is of great importance for the signal light to have a flat structure, so that it projects only slightly above the traffic surface. This requirement is fulfilled by the signal light according to Ahlen et al only to a limited extent and problems may occur during practice when driving over the device or when the traffic area has to be cleaned or cleared.

In order to avoid these problems, the light exit openings are frequently recessed, at least partly. However, the corresponding recesses may become contaminated with water, dirt, or other contaminants so that discharge and cleaning cycles must be provided. Otherwise, the light intensity is expected to markedly decrease, thereby effecting the safety associated with the traffic facility.

Accordingly there exists a need for a signal light for incorporation into the pavement of runways and other traffic areas that provides consistent lighting, yet remains essentially flush with the pavement surface.

SUMMARY OF THE INVENTION

It is accordingly an object of the present invention to provide a compact signal light that is essentially flush with the outer surface of its support base, whether the base is an airport runway or taxiway, a street or highway, or any other traffic area.

To this end, a signal light for mounting within a support base to be substantially flush with respect to an outer surface of the support base comprises a housing, a light source arranged in said housing, a light processing assembly having an entry area for collecting light from said light source, an exit area for emitting light, and a curved mirror for reflecting and processing light between said entry and exit area, wherein said light deflecting optics is designed for emitting a light bundle, which light bundle is substantially non-divergent in at least one direction. The curved mirror allows the light processing assembly to process light efficiently and in a compact manner.

Preferably, the entry area is larger than the exit area, wherein said light has higher intensity at the exit area than at the entry area, and wherein said light at the entry area is substantially non-divergent and non-convergent, i.e. "parallel". In such an arrangement, the light processing assembly increases the light intensity and is therefore able to emit it from a very small area, which allows to reduce the size of the exit aperture. This permits a very flat construction.

In a preferred embodiment, the entry area comprises convergent input optics for directing light towards said mirror in convergent manner. This convergence can be compensated by the curvature of the mirror, e.g. by curving the mirror in such a way that it emits the light in non-convergent and non-divergent manner. "Non-convergent and non-divergent" in this sense relates to the convergence/divergence of the light bundle in at least one direction, preferably the vertical direction, while the light may e.g. be divergent horizontally. In the direction where the light is neither convergent nor divergent, it forms a light field with only small aperture, e.g. in the order of a few degrees.

Preferably, said light processing assembly comprises a transparent optical body, wherein said entry area is formed by an entry surface of said body and wherein said exit area is formed by an exit surface of said body. The mirror can also be formed by a surface of the body.

The entry surface is preferably curved outwards, e.g. by having generally cylindric shape. As a result of this, light collection can be achieved in at least one direction. However, Fresnel lenses, holograms, curved mirrors or index-gradient optics may be used for this purpose.

The exit surface is preferably perpendicular to the exiting light. As a result of this, the exit surface will be smaller, which reduces the danger of soiling, damage or both.

In a preferred embodiment, the light source comprises a curved array of light emitting diodes generating light convergent onto the curved mirror. This obviates the need for providing strongly convergent input optics. The light from the diodes can be processed in a transparent optical body having a flat entry surface section forming said entry area, a flat exit surface section forming said exit area, and a curved mirror surface section forming said curved mirror.

In another aspect of the invention, the signal light for mounting within a support base to be substantially flush with respect to an outer surface of the support base comprises a housing, a light source arranged in said housing, and a light processing assembly for generating an emerging light bundle, which light bundle is substantially non-divergent in at least one direction, said light processing assembly comprising a first optical body having an entry surface for collecting light from said light source in convergent manner and an exit surface for emitting light from said first body in substantially non-convergent manner, wherein said entry surface and said exit surface each form one of a curved lens and a Fresnel lens.

In yet another aspect of the invention, the signal light for mounting within a support base to be substantially flush with respect to an outer surface of the support base comprises a housing, a light source arranged in said housing and a transparent optical body having an entry surface section for receiving light from said light source, an exit surface section for emitting a light bundle that is substantially non-divergent and non-convergent in at least one direction, and a curved mirror surface section for reflecting light between said entry and exit area, wherein in said at least one direction said light is impinging in convergent manner onto said curved mirror surface section and is being reflected therefrom in substantially non-divergent and non-convergent manner.

Preferably, the entry area includes a filter formed by one of a dichroic mirror and colored glass.

By the above, the present invention provides a signal light for mounting in a traffic surface that provides sufficient and consistent ground level lighting and remains essentially flush with the pavement.

DESCRIPTION OF THE PREFERRED EMBODIMENT

Figure 1:
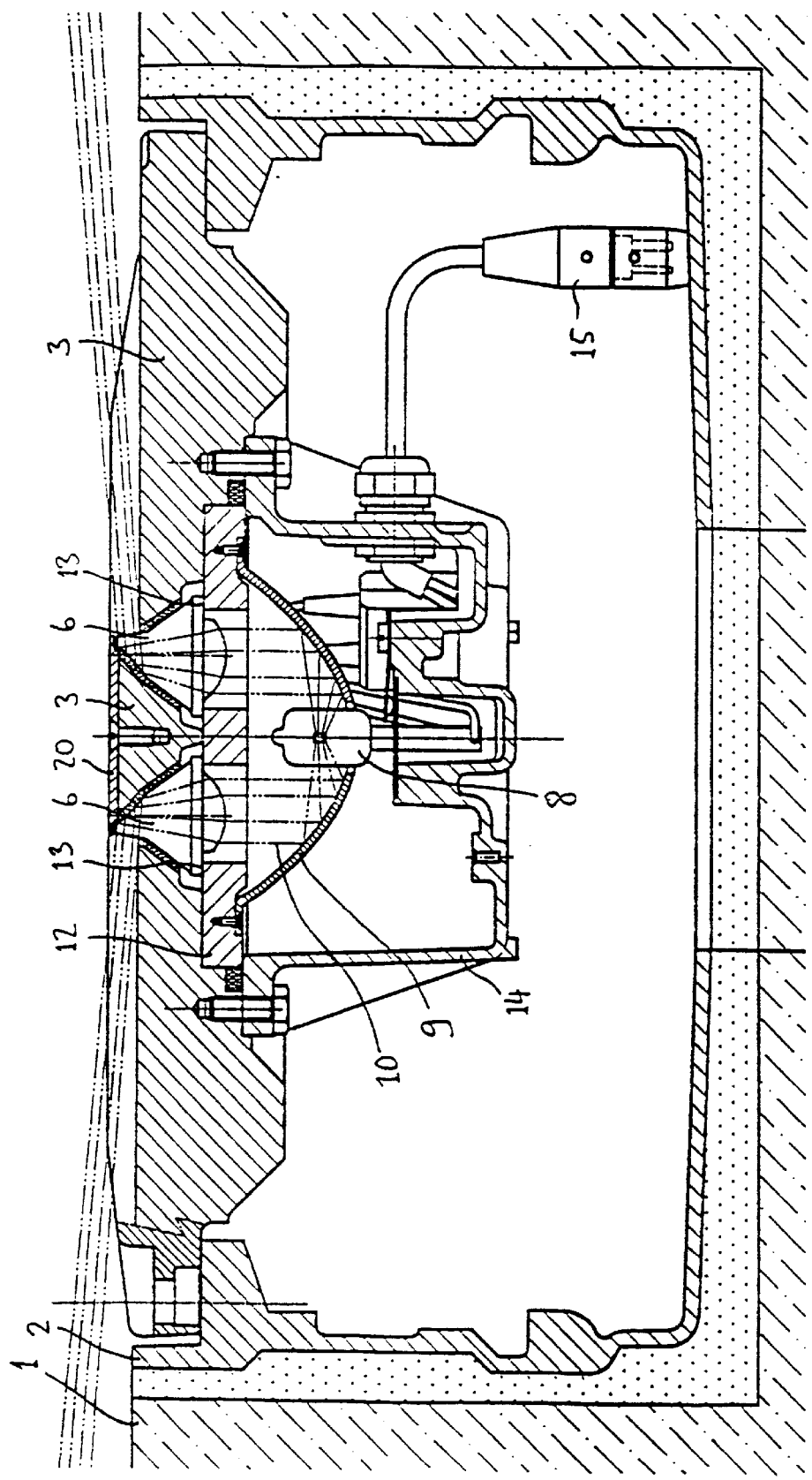
FIG. 1 is a section view of a signal light for incorporation into traffic areas according to one preferred embodiment of the invention.
Figure 2:
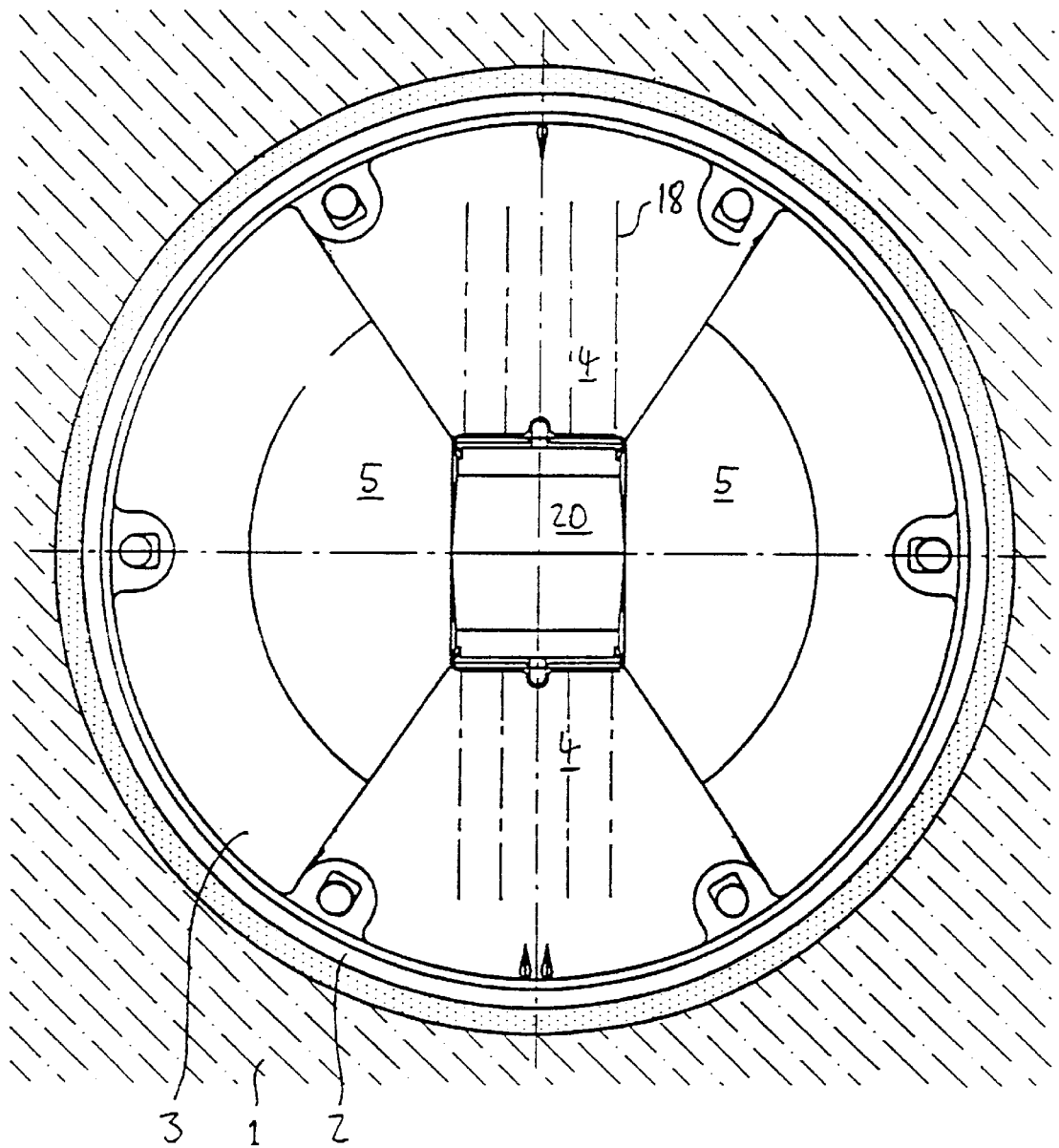
FIG. 2 is a plan view of the embodiment of FIG. 1.

Turning now to the drawings and, more particularly to FIGS. 1 and 2, the basic structure of a preferred embodiment of the invention is illustrated. Here, an under-pavement light armature is shown, for example, as it can be used on the runway 1 of an airport. The runway and associated ground support comprise the support base for the signal lamp of the present invention. The light armature has a housing 2, which is cemented in a known manner into runway 1. A round cover 3 is attached to the housing 2. Vehicles can run over this cover. As seen in FIG. 2, the cover 3 includes two generally flat recessed segments 4, which lie between two segments 5 that are raised by a few millimeters. Also, more than two flat segments 4 or only one may be provided. A light processing assembly 6, also discussed herein as optics, is arranged in approximately the middle of each recessed segment 4. The structure will be discussed in greater detail below.

A lamp 8 is disposed in approximately the center of the housing 2, below cover 3. The lamp 8 is arranged in a parabolic reflector 9, so that its light will impinge on the light processing assembly 6 upward as an essentially "parallel", i.e., neither convergent nor divergent, light beam 10. The light source consists of a lamp 8 and a reflector 9. The reflector 9, optionally, as well as the light source with lamp 8, is appropriately removably attached onto a mounting plate 12, which in turn supports each of the light processing assemblies 6 on the respective base 13. The light source is arranged in a holder 14 and is connected to the power source through a plug connection 15. The light source can also be mounted separately in the lower part.

The signal light of the present invention is generally suitable for an essentially flush incorporation into traffic surfaces. The term "essentially flush" indicates that the projection above the traffic surface is on the order of a few millimeters. The present inventive signal light protrudes above the traffic surface by a maximum of 6 mm, has no recesses in which water could collect and is constructed so robustly that vehicles can drive over it.

Figure 3:
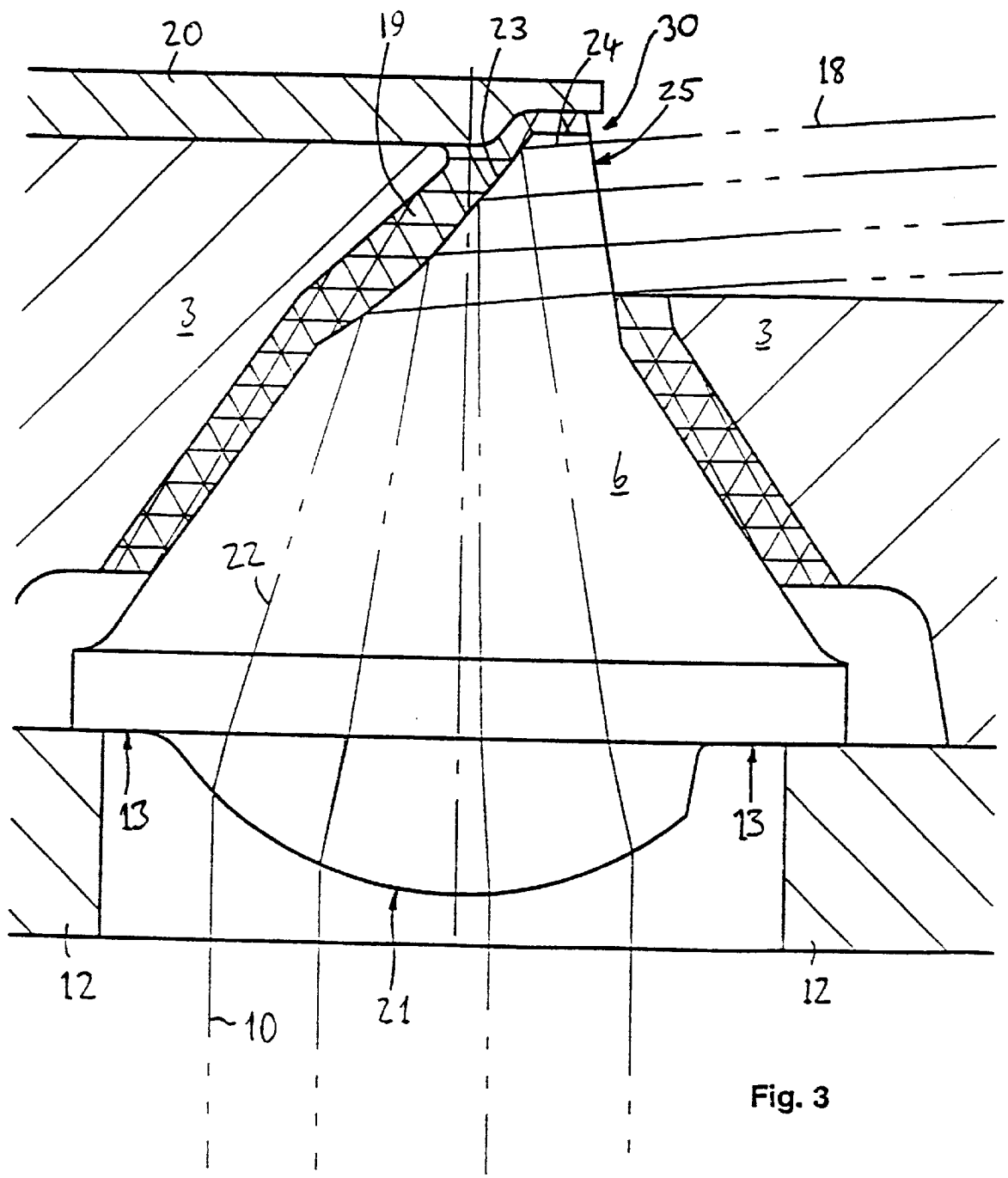
FIG. 3 is section view of the optics of one preferred embodiment of the present invention.

A first preferred embodiment of the light processing assembly 6 can be seen in FIG. 3. In general, light processing assembly 6 collects incoming parallel light beam 10 impinging on it from underneath, deflects it to the horizontal direction and emits it again as a substantially parallel, i.e. neither divergent or convergent, light beam. As seen in FIG. 3, light processing assembly 6 consists of a prismatic transparent body, preferably made of borosilicate glass and is constructed so as to be essentially translational-symmetrical in the direction generally perpendicular to incoming light. Borosilicate glass is preferred because of its resistance to temperature shock or temperature changes.

As previously addressed, the light processing assembly 6 rests with its base 13 on a mounting plate 12. Toward the top, it is protected by a cover plate 20, which is screwed into the cover 3. The light processing assembly 6 is sealed with a hardenable putty 19 against cover 3, so that the inside of the device is effectively sealed and at the same time can withstand thermal dilatations of the component parts, in addition to shock and vibrations. The housing includes a light emitting aperture 30, at which the light outlet, or exit surface, 25 of the light processing assembly 6 is disposed.

The light processing assembly 6 includes first and second arrangements for receiving and directing light either formed therein or operatively associated therewith, depending on the embodiment, with the first arrangement for receiving and directing light being disposed at a light inlet portion of the housing. The second arrangement for receiving and directing light is disposed a predetermined distance from the first arrangement for receiving and directing light within the light processing assembly 6.

With reference to the first preferred embodiment illustrated in FIG. 3, the first arrangement for receiving and directing light is disposed at the entry region of the light processing assembly 6 and is formed by a approximately cylindrical lens surface 21 arched, or curved toward the outside, which deviates the entering light radiation 10 into a convergent light beam 22, that is, converging toward the second arrangement for receiving and directing light. The convergent light beam 22 impinges on the second arrangement for receiving and directing light, namely, a mirror surface 23 of the light processing assembly 6, which is formed by a mirrored surface area curved cylindrically toward the inside. The curvature of the mirror surface 23 is designed so that the convergent light beam 22 is deflected into a linearly extending light beam 24, which has an elevation angle of approximately 5°. The light beam 24 impinges essentially perpendicularly onto the exit surface 25 of light processing assembly 6 and leaves the signal light through the light emitting aperture 30 as light beam 18.

The light from the light source is intensified during its passage through the light processing assembly of the present invention. As a result of the focusing action of the curved lens surface 21, the cross-sectional area of the light field is reduced upon passage through the light processing assembly so that its intensity, i.e. the radiation output per transparent cross-sectional unit area ($cm^2$) is greater at the exit than at the entry and the entry area has a larger cross-sectional area than the exit area. This permits the light outlet 25 to be designed very small, so that the projection of the device above the pavement can remain small. The small size of the light outlet 25 also reduces the danger of damage, for example, during snow removal or cleaning work. In this connection, it is also advantageous that the light outlet 25 is flat and thus it is more difficult to damage functionally.

Preferably, the entry lens surface 21 and the light outlet 25 of light processing assembly 6 are provided with suitable coatings. A dichroic filter can be applied to the entry lens surface 21, which reflects heat radiation in the infrared region or which allows only light of a certain wavelength region to be transmitted. For example, on the light outlet 25, one can apply a dirt-repellant and/or scratch-resistant coating. Alternatively, or in addition to this, a transparent protective plate can be arranged on the exit side of the light outlet 25, which can also be designed so that it is optically effective. For example, it may have a Fresnel structure.

The design of the optics according to FIG. 3 is preferred, because only one glass optical body is necessary. As a result of this, the manufacture and adjustment are simpler and reflection losses are smaller. However, several embodiments of the invention are possible. While six embodiments of the present invention are herein described and illustrated, it will be appreciated by those skilled in the art that other versions of the present signal light are attainable without departing from the spirit and scope of the present invention.

Figure 4:
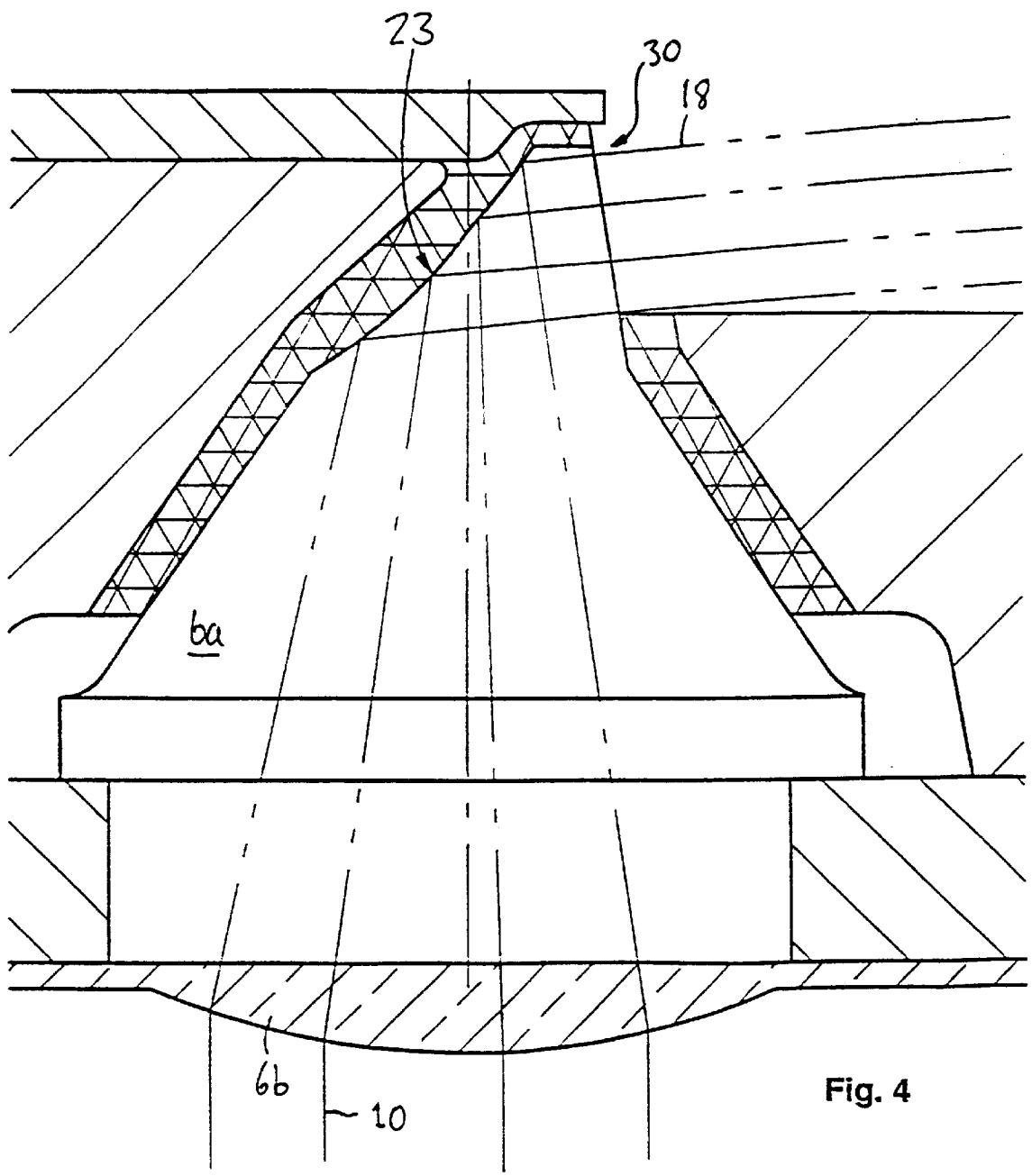
FIG. 4 illustrates a second preferred embodiment of the optics according to the present invention.

Thus, for example, FIG. 4 illustrates a second preferred embodiment in which the light processing assembly 6 is made of a prism portion 6a and a plane convex cylindrical lens 6b. The plane-convex cylindrical lens 6b focuses the entering beam 10 in the same way as the curved entry surface 21 of the first embodiment. The deflection of the beam is done again with the aid of a cylindrical mirror 23.

Figure 5:
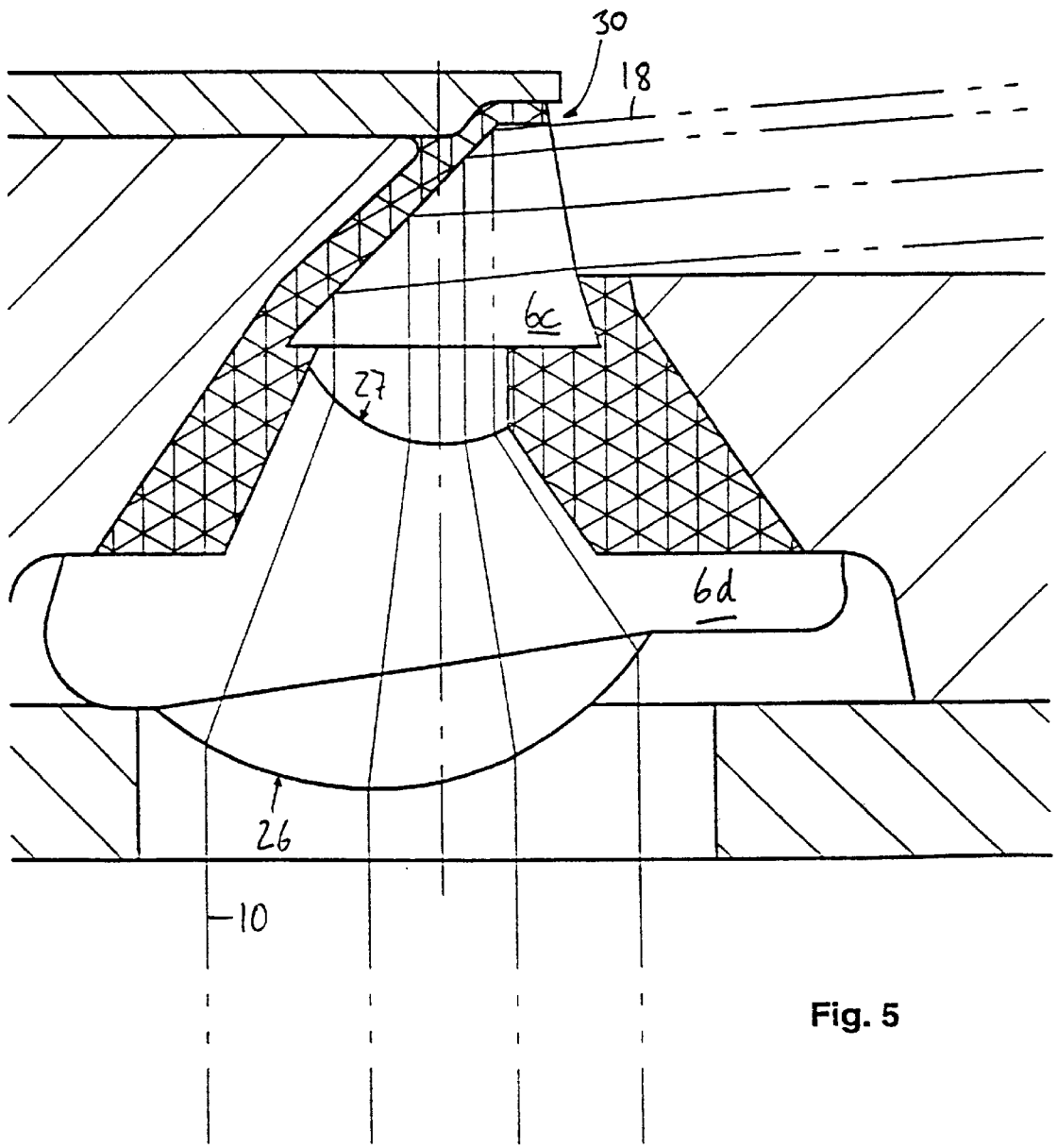
FIG. 5 illustrates a third preferred embodiment of the optics according to the present invention.

FIG. 5 illustrates a third preferred embodiment of the light processing assembly with a prismatic body 6c and a convex-concave collecting light processing assembly 6d. Here, the entering light beam 10 is collected by the cylindrical outward-arching entry surface 26 and again converted by the cylindrical inwardly arched surface 27 into a parallel light beam again. The "arching" curvature is taken with respect to the central portion of the light processing assembly 6d. The prismatic body 6c acts as a mirror prism to deflect the light beam without its divergence being changed.

Figure 6:
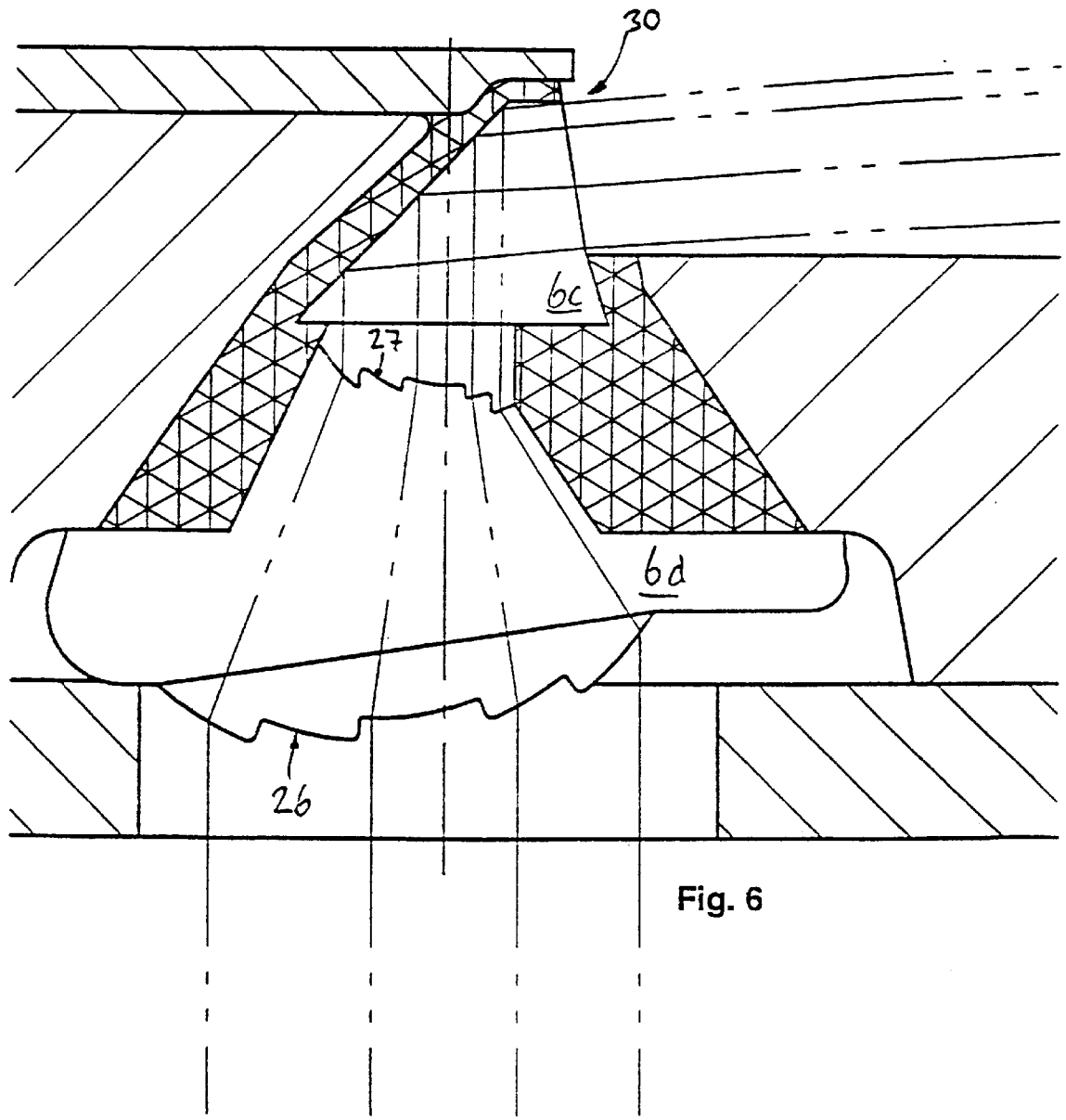
FIG. 6 illustrates a fourth preferred embodiment of the optics according to the present invention.

The fourth preferred embodiment according to FIG. 6 is constructed essentially the same way. However, it shows that the surfaces 26 and 27 can be designed as Fresnel lenses or cylindrical lens segments, respectively. In the same way, it is possible to use holographic lenses, especially when, instead of an incandescent lamp 8, an essentially monochromatic semiconductor light source is used.

Figure 7:
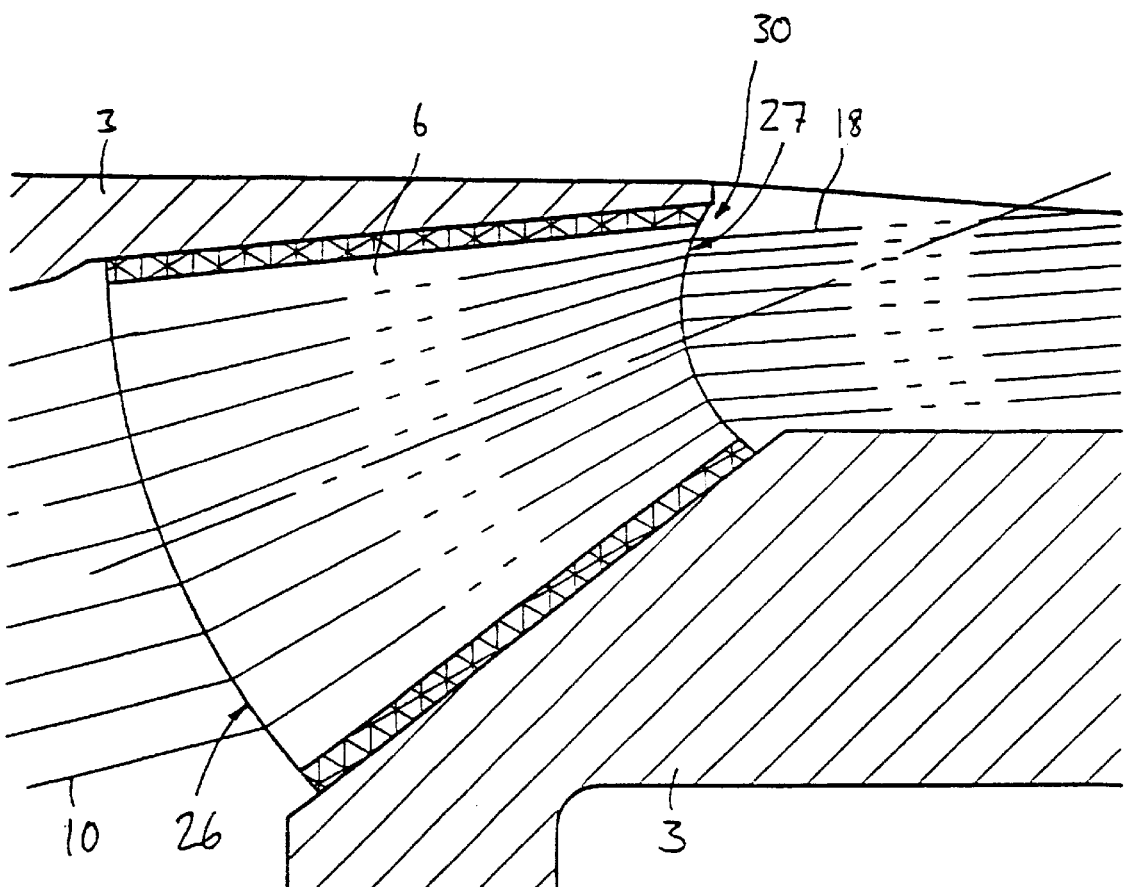
FIG. 7 illustrates a fifth preferred embodiment of the optics according to the present invention.

FIG. 7 shows the a fifth variant of the light processing assembly 6 in which it is assumed that the parallel light beam 10 runs essentially flat already from the light source so that, at most, a slight deflection is necessary and the mirror can be omitted. In this case, a convex-concave glass optical body can be used as the light processing assembly 6, the cylindrical, outward curved entry surface 26 of which collects the light and the cylindrical inwardly curved exit surface of which again produces an essentially parallel light beam 18 with the desired inclination.

Figure 8:
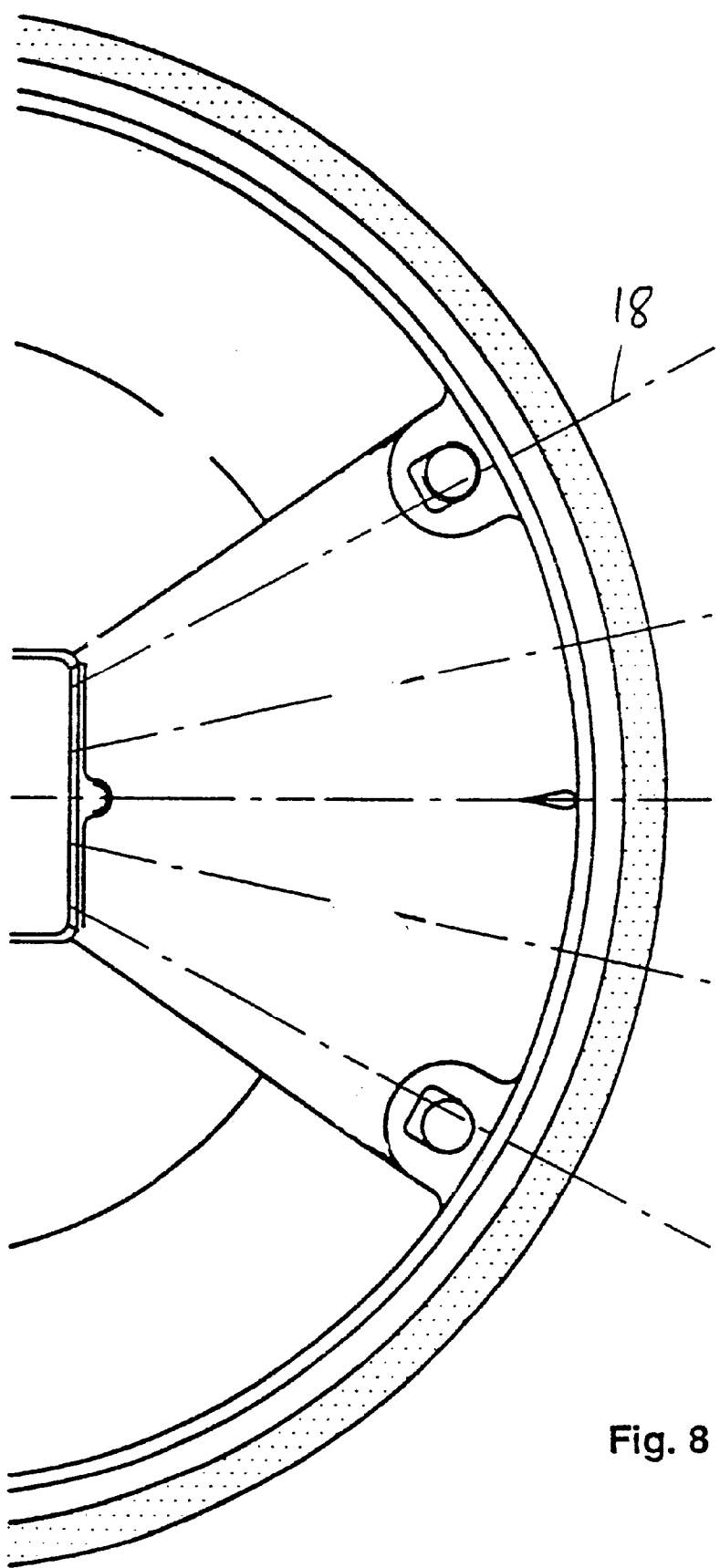
FIG. 8 is a plan view of any embodiment of the signal light illustrating a beam path divergent in the horizontal direction.

In the practical examples discussed so far, it was assumed that the exiting light beam 18 is essentially linearly directed or parallel, that is, that its divergence is small, for example, ±5°. However, depending on the requirements, only the divergence in the vertical direction should be so small, while the horizontal divergence should be higher e.g., in curves on a taxiway. A corresponding radiation field 18 is illustrated in FIG. 8. This radiation field is "parallel" that is, nondivergent, only in the vertical direction, while it has a large divergence in the horizontal direction.

There are various possibilities for producing a radiation field 18 according to FIG. 8. Thus, in the embodiment according to FIG. 3, for example, the entry lens surface 21 can be designed to be convex or concave in the direction perpendicular to the plane of the drawing or it can be provided with scattering ribs which run parallel to the plane of the drawing. However, the mirror surface 23 or the light outlet 25 may be designed for producing a divergent radiation field in the horizontal direction, again by using suitable curvature or scattering bodies. Finally, the light source may be designed in such a way that already the entering light beam is divergent in one direction, i.e., in the direction perpendicular to the plane of FIG. 3.

By designing the entry lens surface 21, 26, so that it is concave, it can be achieved, in the direction perpendicular to the plane of the drawing of FIG. 3, that the light beam 22 is convergent in both directions. As a result of this, a smaller mirror surface 23 and light outlet 25 is necessary. If the exiting light beam 18 should be linearly extending in both directions simultaneously, that is, should have small divergence in the horizontal and vertical direction, then, for example, the mirror surface 23 or the light outlet 25 can be provided with a corresponding curvature which compensates again the divergence of the light beam 24 in the horizontal direction.

Figure 9:
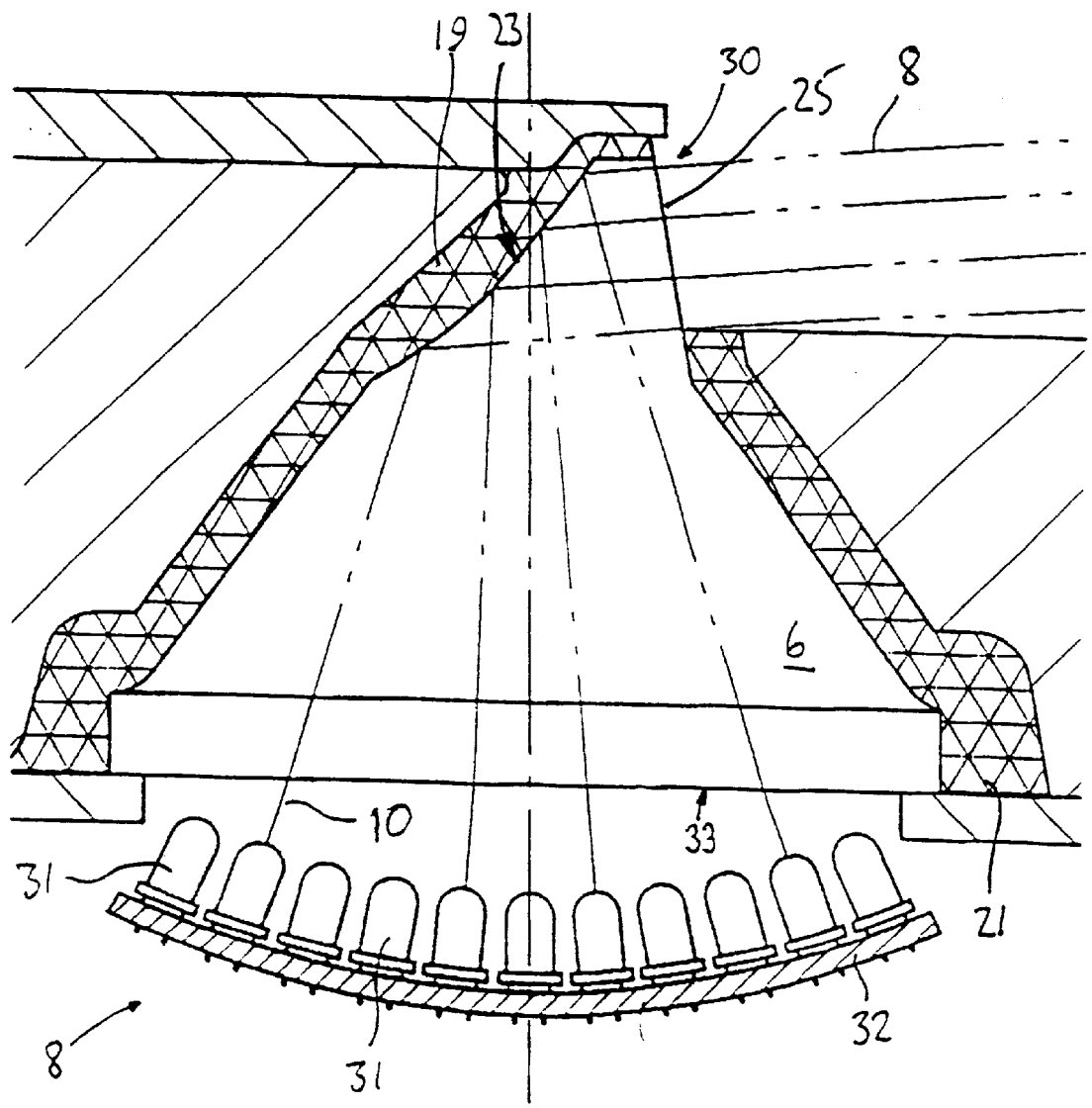
FIG. 9 is a sixth preferred embodiment of the present invention.

FIG. 9 illustrates a sixth preferred embodiment of the present invention using light diodes (LEDs) 31 as light source 8. The LEDs are mounted to a common support 32, e.g. a curved printed circuit board, and they are arranged in a cylindrically curved matrix. FIG. 9 shows a cross section of this matrix, which matrix is extending perpendicular to the plane of the drawing. The axes of the LEDs all meet in a common line, i.e. the LEDs generate a cylindrically converging input light field 10.

Light processing assembly 6 is a single prism having a flat input surface section 33 for receiving the light 10 from the LEDs. This light impinges on curved mirror 23 formed by a mirror surface section of light processing assembly 6. The curvature of mirror 23 is such that the reflected light is substantially parallel in vertical direction, i.e. the light's aperture in vertical direction is small. The reflected light exits through the flat exit surface section 25 and exit aperture 30.

Preferably, LEDs of different colors are used. They can either be operated together to generate substantially white light, or they can be operated in blocks of differing colors to generate colored light, e.g. for signaling purposes.

In the embodiments shown so far, the optics was embedded in a putty 21. However, one can also consider equipping the optics with a suitable tight sleeve and replacement system so that, if necessary, it can be replaced simply.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A signal light for mounting within a support base to be essentially flush with respect to an outer surface of the support base comprising a housing, a light source arranged in said housing, a light processing assembly having an entry area for collecting light from said light source, an exit area for emitting light, and a curved mirror for reflecting and processing light between said entry area and said exit area, and a convergent input optics for directing light toward said curved mirror in a convergent manner, and wherein said light processing assembly is designed for emitting a light bundle, which light bundle is non-divergent in at least one direction.

2. The signal light of claim 1 wherein said entry area is larger than said exit area, wherein said light has higher intensity at said exit area than at said entry area, and wherein said light at said entry area is non-divergent and non-convergent.

3. The signal light of claim 1 wherein said mirror is curved for deflecting light from said input optics in non-convergent and non-divergent manner.

4. The signal light of claim 1 wherein said light enters said entry area from below and exits from said exit area in substantially horizontal direction.

5. The signal light of claim 1 wherein said exit area is formed by a substantially flat surface substantially perpendicular to said light exiting from said exit area.

6. The signal light of claim 1 wherein said light processing assembly comprises a transparent optical body, wherein said entry area is formed by an entry surface of said body and wherein said exit area is formed by an exit surface of said body.

7. The signal light of claim 6 wherein said mirror is formed by a curved mirror surface of said body.

8. The signal light of claim 7 wherein said mirror surface is curved inwards.

9. The signal light of claim 8 wherein said mirror surface is curved in a cylindric manner.

10. The signal light of claim 6 wherein said entry surface is curved outwards.

11. The signal light of claim 10 wherein said entry surface is curved in cylindric manner.

12. The signal light of claim 6 wherein said transparent optical body has substantially prism-shape, wherein said entry area is arranged at a base of said prism-shape and said mirror and said exit area are arranged at an edge region opposite to said base.

13. The signal light of claim 1 comprising a filter in said entry area wherein said filter is formed by one of a dichroic mirror and colored glass.

14. The signal light of claim 1 comprising a cover plate covering said light processing assembly from above.

15. A signal light for mounting within a support base to be essentially flush with respect to an outer surface of the support base comprising a housing, a light source arranged in said housing, said light source comprising a curved array of light emitting diodes generating light convergent onto said curved mirror, a light processing assembly having an entry area for collecting light from said light source, an exit area for emitting light, and a curved mirror for reflecting and processing light between said entry area and exit area, wherein said light processing assembly is designed for emitting a light bundle, which light bundle is non-divergent in at least one direction.

16. The signal light of claim 15 wherein said light processing assembly comprises a transparent optical body having a flat entry surface section forming said entry area, a flat exit surface section forming said exit area, and a curved mirror surface section forming said curved mirror.

17. The signal light of claim 1, wherein said light at said exit area is non-convergent and non-divergent in vertical direction and divergent in horizontal direction.

18. A signal light for mounting within a support base to be essentially flush with respect to an outer surface of the support base comprising a housing, a light source arranged in said housing, and a light processing assembly for generating a light bundle, which light bundle is non-divergent in at least one direction, said light processing assembly comprising a first optical body having an entry surface for collecting light from said light source in a convergent manner, and an exit surface for emitting light from said first optical body in a non-convergent manner, wherein said entry surface and said exit surface each form one of a curved lens and a Fresnel lens.

19. The signal light of claim 18 wherein said entry area is larger than said exit area, wherein said light has higher intensity at said exit surface than at said entry surface and wherein said light at said entry surface is non-divergent and non-convergent.

20. The signal light of claim 18, wherein said entry surface of said first optical body is curved outwards for collecting light in convergent manner and wherein said exit surface of said first optical body is curved inwards for making said light from said entry surface non-convergent.

21. The signal light of claim 18, wherein said light processing assembly comprises a second transparent optical body having a mirror surface for deflecting light from said first optical body.

22. The signal light of claim 21, wherein said second optical body is arranged at a distance from said first optical body.

23. The signal light of claim 18, wherein said first optical body generates said emerging light bundle.

24. A signal light for mounting within a support base to be essentially flush with respect to an outer surface of the support base comprising a housing, a light source arranged in said housing, and a transparent optical body having an entry surface section for receiving light from said light source, an exit surface section for emitting a light bundle that is non-divergent and non-convergent in at least one direction, and a curved mirror surface section for reflecting light between said entry surface section and exit surface section wherein in said at least one direction said light is impinging in a convergent manner onto said curved mirror surface section and is being reflected therefrom in a non-divergent and non-convergent manner.

* * * * *